United States Patent
Li et al.

(10) Patent No.: US 10,659,173 B1
(45) Date of Patent: May 19, 2020

(54) DIGITAL ISOLATOR MODULE FOR HIGH LEVEL COMMON MODE TRANSIENT IMMUNITY

(71) Applicant: AMAZING MICROELECTRONIC CORP., New Taipei (TW)

(72) Inventors: Guan-Shun Li, Pingtung County (TW); Szu-Hsien Wu, Taipei (TW)

(73) Assignee: AMAZING MICROELECTRONIC CORP., New Taipei (TW)

( * ) Notice: Subject to any disclaimer, the term of this patent is extended or adjusted under 35 U.S.C. 154(b) by 0 days.

(21) Appl. No.: 16/515,213

(22) Filed: Jul. 18, 2019

(51) Int. Cl.
   *H04B 1/40* (2015.01)
   *H04B 15/02* (2006.01)

(52) U.S. Cl.
   CPC ............... *H04B 15/02* (2013.01); *H04B 1/40* (2013.01)

(58) Field of Classification Search
   CPC .................................. H04B 15/02; H04B 1/40
   See application file for complete search history.

(56) References Cited

U.S. PATENT DOCUMENTS

| | | |
|---|---|---|
| 9,257,836 B2 | 2/2016 | Mills et al. |
| 9,553,445 B2 | 1/2017 | Chin et al. |
| 2005/0272378 A1* | 12/2005 | Dupuis ............ H02M 3/33523 455/67.15 |
| 2006/0073150 A1 | 4/2006 | Faris et al. |
| 2008/0315925 A1* | 12/2008 | Alfano ................ H03K 17/691 327/103 |
| 2014/0062527 A1* | 3/2014 | Mills .................... H03K 19/003 326/21 |
| 2014/0169038 A1* | 6/2014 | Kamath .................. H03D 3/00 363/16 |
| 2016/0126724 A1* | 5/2016 | Yun .................... H04L 25/0276 361/111 |
| 2017/0201399 A1* | 7/2017 | Adinarayana ........ H04B 1/0475 |

* cited by examiner

*Primary Examiner* — Syed Haider
(74) *Attorney, Agent, or Firm* — Rosenberg, Klein & Lee

(57) ABSTRACT

A digital isolator module for high level common mode transient immunity is provided, comprising a transmitter circuit (TX), a receiver circuit (RX) and an isolation barrier which is connected there in between, wherein the transmitter circuit is electrically connected to a first ground voltage level and the receiver circuit is electrically connected to a second ground voltage level. The receiver circuit further comprises a resistance set, a high speed detector and a demodulator. By employing the proposed circuit diagram of the invention, interferences occurring at the common mode are suppressed and an RX output signal is synchronized with its input signal without having propagation delay.

12 Claims, 12 Drawing Sheets

DIGITAL ISOLATOR MODULE FOR HIGH LEVEL COMMON MODE TRANSIENT IMMUNITY

BACKGROUND OF THE INVENTION

Field of the Invention

The present invention is related to an isolation circuit, and more particularly to a digital isolator module which is employed for high level common mode transient immunity while ensuring reliable data transmission without propagation delay.

Description of the Prior Art

As we know, isolation circuits are the interface circuits that provide galvanic isolation between two communicating blocks, for example, a transmitter circuit (TX) and a receiver circuit (RX). Such isolation circuits are required to eliminate avoidable ground loops, and also to protect high voltage sensitive circuits. These circuits ensure electric insulation and signal isolation between the circuits, ensuring reliable data transmission between the two circuits, isolating the signal from fast transient common mode noise. In applications where common mode noise can be expected and human interactions are inevitable (e.g., cardiograph), then the isolation circuits act as an interface, ensuring safety and reliability. In several industrial applications which are susceptible to electrical surges, fast transients and high noise floors, isolation circuits have been widely used for safety and reliability.

Please refer to FIG. 1, which shows a schematic drawing of a conventional isolation circuit architecture, wherein the two communicating blocks TX 10 and RX 20 are respectively connected to a ground voltage $V_{ss1}$ and $V_{ss2}$. The isolation circuit is aimed to isolate these two ground voltages $V_{ss1}$ and $V_{ss2}$ apart. As known, DI is an input of the isolation circuit and RO is its output. In the transmission proceeding progress, at first, DI is input to control the TX 10 to generate differential signals. An isolation capacitance pair 22 is configured between the TX 10 and the RX 20 for coupling the signals from the transmitter side to the receiver side, such that the RX 20 outputs the output signal RO. In general, a voltage level of the input signal DI should be followed by the voltage level of the output signal RO. Nevertheless, transmission errors always occur due to a transient common noise $V_{GND}$ generated between these two ground voltages $V_{ss1}$ and $V_{ss2}$. For example, a spike, electrical loop between two ground voltages, or any systematic issues are the commonly known factors. Also, since the conventional RX scheme circuits are not designed to be able to afford and tolerate high $V_{GND}$ voltages, the signal transmission has inevitably gone wrong owing to such the transient common noise, and the performance of the isolation circuit to convey signals suffers a lot due to common mode current transients.

As such, in order to ensure the robustness and reliability of the data transmission, common mode transient immunity (CMTI) has been expected to be improved as high as possible. And efforts to improve isolation circuit performances are ongoing. For example, An U.S. Pat. No. 9,257,836 discloses a common transient suppression circuit coupled to a receive circuit to suppress transients in signals received by the receive circuit that were transmitted from a transmit side of the isolation barrier using optical, magnetic, inductive, or other mechanisms. However, it was observed that its data transmission process encounters propagation delay issues since a certain delay circuit must be involved in such design. Another U.S. patent 2017/0201399 discloses a common mode transient immunity circuit for opto-isolator emulation, which includes a voltage clamping circuit coupled to receive an input signal and to provide a clamped signal, an oscillator coupled to receive the clamped signal and to provide the differential output signals, and a common mode transient immunity (CMTI) circuit that couples respective first terminals of the first and second capacitors to a lower rail responsive to the clamped signal being low. Nevertheless, the aforesaid circuits were configured in the data transmitting side, and can only be taken into consideration and applied to limited conditions, i.e. when there was a decline in common mode noise or ground noise leading to induced current to be pulled towards a transmitter during the negative (also known as a falling) edge of the transient. As a result, it is believed that such design is still in lack of extensive utility and can not be widely used.

Under such circumstances, it, in view of all, should be apparent and obvious that there is indeed an urgent need for the professionals in the field for a novel and inventive isolation circuit to be developed so as to achieve the purposes of not only accurate data transmission process but also extraordinarily high common mode transient immunity.

SUMMARY OF THE INVENTION

In order to overcome the above mentioned disadvantages, one major objective in accordance with the present invention is provided for a novel and creative isolation circuit which can successfully solves the problems of prior arts and achieve precise data transmission result as well as high level common mode transient immunity.

Another objective in accordance with the present invention is provided for a novel digital isolator module, in which a high speed detecting mechanism is employed. By integrating a high speed detecting circuit therewith the conventional receiver side, a common mode voltage level at the input of the receiver side can be stabilized, such that its output signal RO can be synchronized with the input signal DI and no propagation delay is observed to be occurred.

And yet another objective in accordance with the present invention is provided for a digital isolator module for high level common mode transient immunity, in which the all new high speed detecting circuit scheme is proposed to have not only a source type transient control but also a sink type transient control. Depending on the waveform and voltage level (i.e. a rise or a decline) of the transient common noise generated between two respective grounds, either a source current or a sink current will be generated to compensate the interfered current and to maintain the system robustness and common mode voltage level of the circuit.

For achieving the above mentioned objectives, the present invention provides a digital isolator module for high level common mode transient immunity, comprising: a transmitter circuit, coupled to receive an input signal and generate a pair of differential signals; an isolation barrier, having two input ends for receiving and coupling the pair of differential signals and two output ends for accordingly generating a pair of coupled signals; and a receiver circuit, connected with the isolation barrier to receive the pair of coupled signals and generate an output signal.

In one embodiment, the isolation barrier comprises a first capacitor and a second capacitor, which are connected in parallel. And, each of the first capacitor and the second capacitor is connected between an output end of the transmitter circuit and an input end of the receiver circuit.

In a preferred embodiment of the present invention, the receiver circuit further comprises a resistance set, a high speed detector and a demodulator, wherein two first ends of the resistance set are respectively connected to the two output ends of the isolation barrier and two second ends of the resistance set are jointed and connected to an input end, being also the output end of the high speed detector. The demodulator is connected with the first ends of the resistance set so as to generate the output signal.

In one embodiment, the resistance set may comprise a first resistor and a second resistor, which are connected in parallel. And each of the first resistor and the second resistor is connected between an input end of the demodulator and the high speed detector.

According to the present invention, the transmitter circuit is electrically connected to a first ground voltage level $V_{ss1}$ and the receiver circuit is electrically connected to a second ground voltage level $V_{ss2}$. As such, when there is a transient common noise $V_{GND}$ which is generated between the first ground voltage level $V_{ss1}$ and the second ground voltage level $V_{ss2}$, the high speed detector detects a voltage signal of the input end, being also the output end of the high speed detector (i.e. $V_{CM}$) for determining if a compensation current is provided such that interferences occurring at the input end, being also the output end of the high speed detector are suppressed. In addition, the output signal can be synchronized with the input signal without propagation delay.

Therefore, in a preferred embodiment of the present invention, the high speed detector is designed to comprise a detecting circuit and a current source circuit, wherein the detecting circuit further comprises a source type transient control unit and a sink type transient control unit, and the current source circuit further comprises a source type current source and a sink type current source.

An output end of the source type transient control unit is connected to the source type current source. An output end of the sink type transient control unit is connected to the sink type current source. By such designed arrangements, the source type current source is controlled by the source type transient control unit so as to provide a source current. In a preferred embodiment of the present invention, the source type current source can be implemented as a P type Metal Oxide Semiconductor Field Effect Transistor (PMOS). In another aspect, the sink type current source is controlled by the sink type transient control unit so as to provide a sink current. In a preferred embodiment of the present invention, the sink type current source can be implemented as an N type Metal Oxide Semiconductor Field Effect Transistor (NMOS) In other words, when the transient common noise is at a rising edge, then the sink type transient control unit controls the sink type current source, so the compensation current is the generated sink current.

Similarly, when the transient common noise is at a falling edge, then the source type transient control unit controls the source type current source, so the compensation current is the generated source current.

As a result, it is believed that the source current and/or the sink current can be sophisticated provided so as to compensate an interfered current at $V_{CM}$ and to stabilize the common mode voltage level of the circuit. And thus, the system robustness, common mode voltage level of the circuit, and high level common mode transient immunity are accomplished through the present invention.

Based on the above, it has been proved that the present invention is well designed and indeed discloses a novel digital isolator module for high level common mode transient immunity. The whole new schemes can be employed in a receiving circuit (RX) architecture, and has been verified to get high level common mode transient immunity (CMTI), better system robustness and precise data transmission results. Thus, it is believed that the present invention is advantageous of having excellent control stability over system levels as well as maintaining precise control ability to the isolation circuits while compared to the prior arts.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
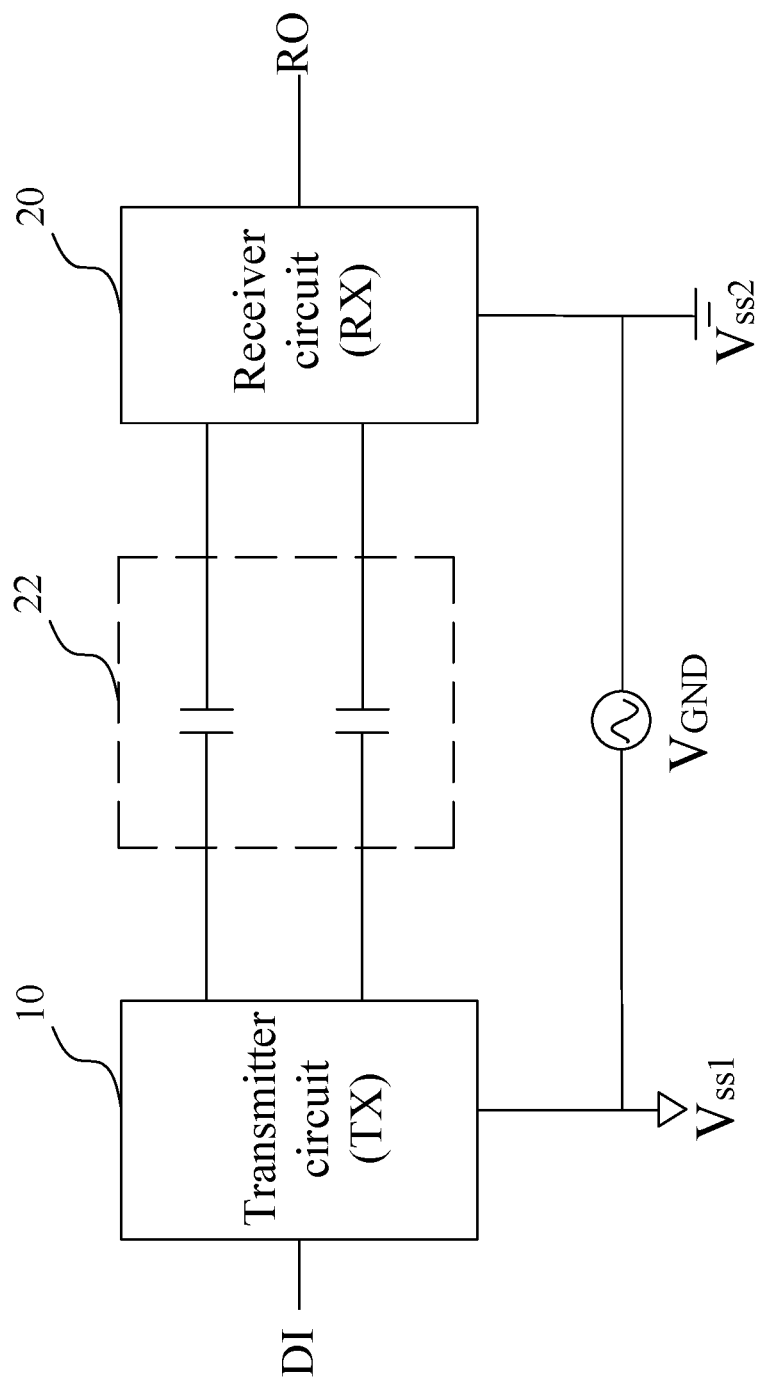
FIG. 1 shows a schematic drawing of a conventional isolation circuit architecture, wherein the two communicating blocks transmitter circuit (TX) and receiver circuit (RX) are respectively connected to ground voltage.

Reference will now be made in detail to the preferred embodiments of the present invention, examples of which are illustrated in the accompanying drawings. Wherever possible, the same reference numbers are used in the drawings and the description to refer to the same or like parts.

The embodiments described below are illustrated to demonstrate the technical contents and characteristics of the present invention and to enable the persons skilled in the art to understand, make, and use the present invention. However, it shall be noticed that, it is not intended to limit the scope of the present invention. Therefore, any equivalent modification or variation according to the spirit of the present invention is to be also included within the scope of the present invention.

Figure 2:
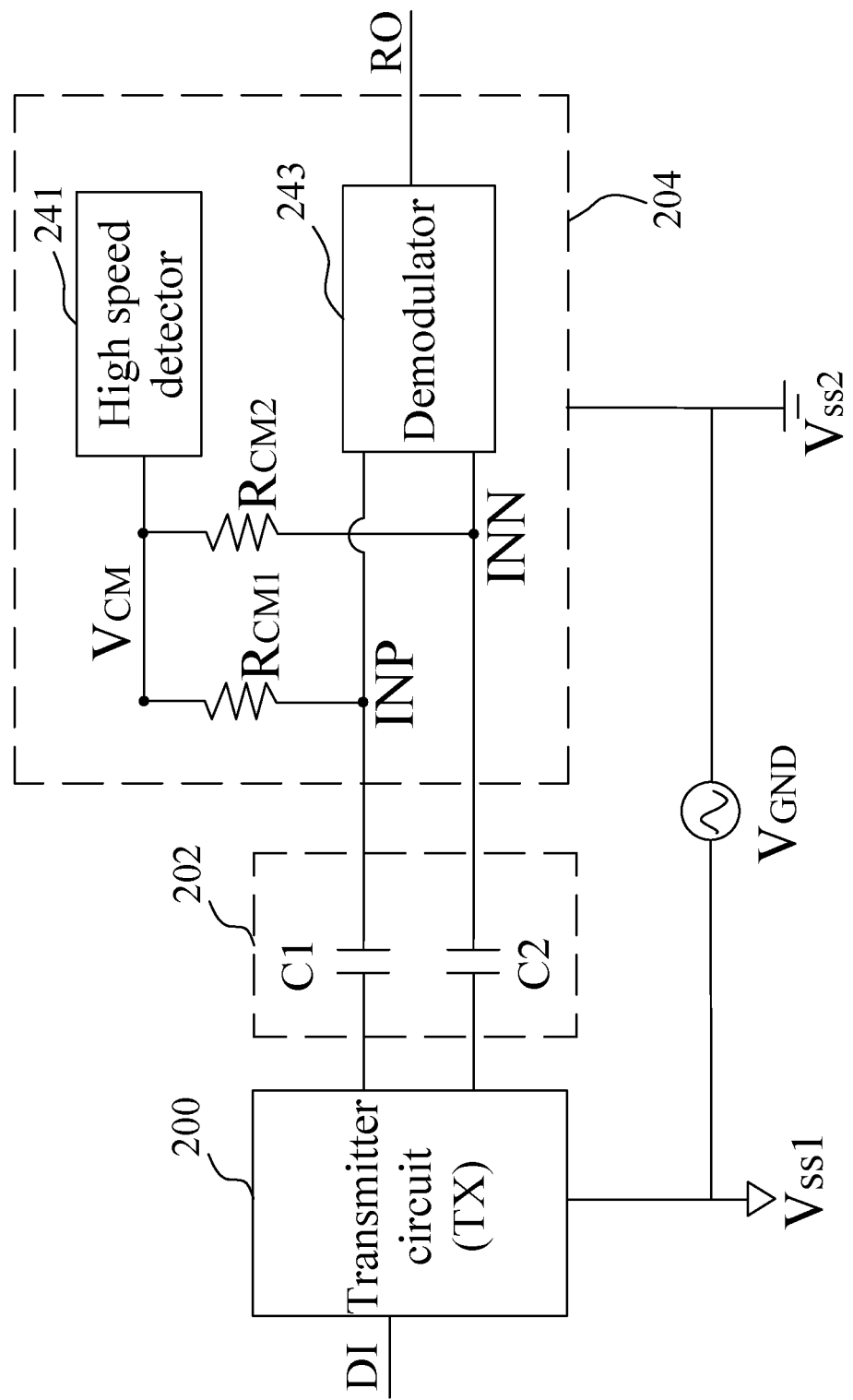
FIG. 2 shows a block diagram of a digital isolator module for high level common mode transient immunity in accordance with one embodiment of the present invention.

Please refer to FIG. 2, which shows a block diagram of a digital isolator module for high level common mode transient immunity in accordance with one embodiment of the present invention. As shown in FIG. 2, the digital isolator module disclosed by the present invention comprises a transmitter circuit (TX) 200, an isolation barrier 202 and a receiver circuit (RX) 204.

The transmitter circuit (TX) 200 receives an input signal DI and generates a pair of differential signals, wherein the transmitter circuit 200 is electrically connected to a first ground voltage level $V_{ss1}$.

The isolation barrier 202 is configured between the transmitter circuit 200 and the receiver circuit (RX) 204, comprising two input ends for receiving and coupling the pair of differential signals from the transmitter circuit 200. According to the embodiment of the present invention, the isolation barrier 202 is composed of a first capacitor C1 and a second capacitor C2 which are connected in parallel. Each of the first capacitor C1 and the second capacitor C2 is connected between an output end of the transmitter circuit 200 and an input end of the receiver circuit 204. Through the two output ends of the isolation barrier 202, a pair of coupled signals are generated and served as inputs to the receiver side.

The receiver circuit 204 which is being connected with the isolation barrier 202 is aimed to receive the pair of coupled signals from the isolation barrier 202 and to accordingly generate an output signal RO. According to the embodiment of the present invention, the receiver circuit 204 is electrically connected to a second ground voltage level $V_{ss2}$ and comprises a high speed detector 241, a demodulator 243 and a resistance set.

According to the embodiment of the present invention, the resistance set comprises a first resistor $R_{CM1}$ and a second resistor $R_{CM2}$ which are connected in parallel. Each of the first resistor $R_{CM1}$ and the second resistor $R_{CM2}$ is connected between an input end of the demodulator 243 and the high speed detector 241.

Two first ends of the resistance set $R_{CM1}$, $R_{CM2}$ are respectively connected to the two output ends of the isolation barrier 202, as indicated by node "INP" and "INN" as shown in FIG. 2. On the other hand, two second ends of the resistance set $R_{CM1}$, $R_{CM2}$ are jointed and connected to an input end, being also the output end of the high speed detector 241, as indicated by "$V_{CM}$" as shown in FIG. 2. The demodulator 243 is connected with nodes "INP" and "INN" for receiving the coupled signals and generating the output signal RO.

Figure 3:
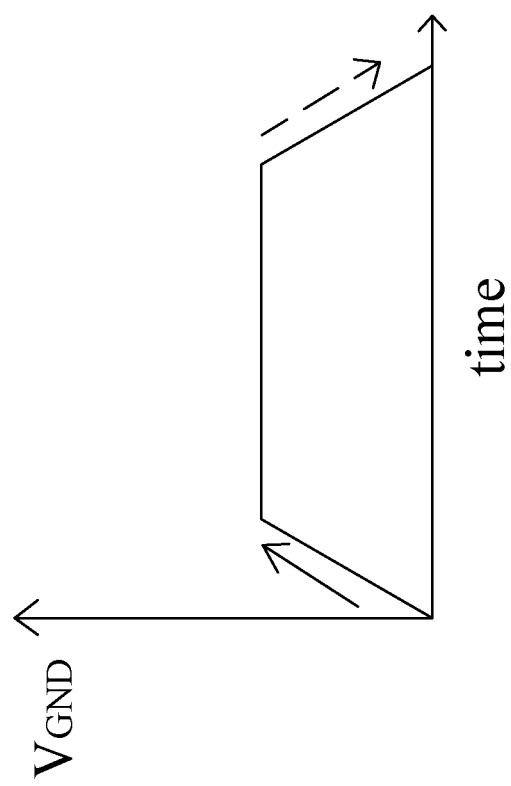
FIG. 3 shows a waveform of a transient common noise $V_{GND}$ comprising a rising edge and a falling edge.

Since a transient common noise $V_{GND}$ is inevitably generated between the first ground voltage level $V_{ss1}$ and the second ground voltage level $V_{ss2}$, an induced current $I_{CM}$ will thus be generated either from the transmitting side (TX) flowing into the receiving side (RX), or from the receiving side (RX) flowing into the transmitting side (TX). Please find referring at the same time to FIG. 3 and FIG. 4, in which FIG. 3 shows a waveform of the transient common noise $V_{GND}$ comprising a rising edge and a falling edge, while in FIG. 4 the accordingly induced current $I_{CM}$ owing to the transient common noise $V_{GND}$ is indicated by the arrows. From these two figures shown, it is obvious that when the transient common noise $V_{GND}$ is increasing and at a rising edge, the induced current $I_{CM}$ will be generated and injected into the receiver circuit 204 as indicated by the solid line.

In the same manners, when the transient common noise $V_{GND}$ is declined and at a falling edge, then the induced current $I_{CM}$ will be generated and flowing back to the transmitter circuit 200 as indicated by the dashed line. On account of these situations, the voltage levels at the nodes "INP" and "INN" are disturbed and become variable, whereby affect the accuracy of the output signal RO. As a result, the proposed isolator circuit structure of the present invention is aimed to stabilize the common mode voltage levels at both the nodes of INP and INN, such that the demodulator 243 can perform normally and correctly for outputting the output signal RO.

In one embodiment, the demodulator 243, for example, can be an On-Off Keying (OOK) demodulator or the like. For people who are skilled in the art and having understandings and technical backgrounds to the present invention, it would be allowed for them to make various modifications or changes depending on different circuit regulations and/or specifications without departing from the scope of the invention. That is to say, the present invention is certainly not limited thereto.

In the following paragraphs, it draws our attention that how the present invention works to stabilize the common mode voltage levels at both the nodes of INP and INN. The main technical features of the proposed circuit diagrams disclosed by the present invention are that, the high speed detector 241 detects a voltage signal of its input end i.e. node of $V_{CM}$ so as to determine if a compensation current is provided. According to a preferred embodiment of the present invention, the compensation current can be either a sink current or a source current, depending on the induced current $I_{CM}$ to be generated and to be injected from the TX side to the RX side, or from the RX side to the TX side.

Figure 5:
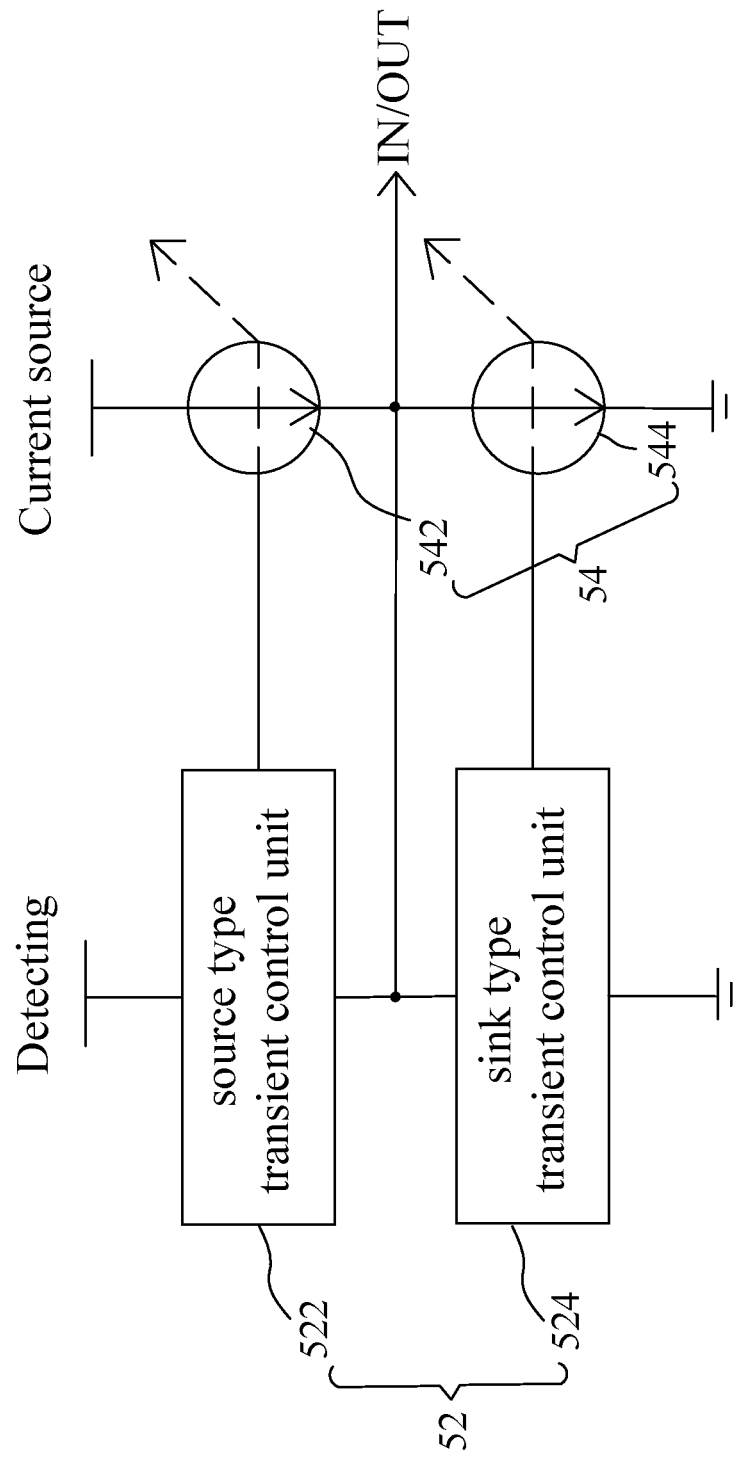
FIG. 5 shows a block diagram of a high speed detector in accordance with one embodiment of the present invention.

Please refer to FIG. 5, which shows a block diagram of the high speed detector in accordance with one embodiment of the present invention. As shown in FIG. 5, the high speed detector 241 comprises a detecting circuit 52 and a current source circuit 54.

The detecting circuit 52 further comprises a source type transient control unit 522 and a sink type transient control unit 524. And, the current source circuit 54 further comprises a source type current source 542 and a sink type current source 544.

An output end of the source type transient control unit 522 is connected to the source type current source 542, and an output end of the sink type transient control unit 524 is connected to the sink type current source 544, such that the source type current source 542 can be controlled relatively by its corresponding source type transient control unit 522 so as to provide a source current.

In a similar methodology, the sink type current source 544 can be controlled relatively by its corresponding sink type transient control unit 524 so as to provide a sink current. The said source current and said sink current are referred as the previously mentioned compensation current.

Figure 6:
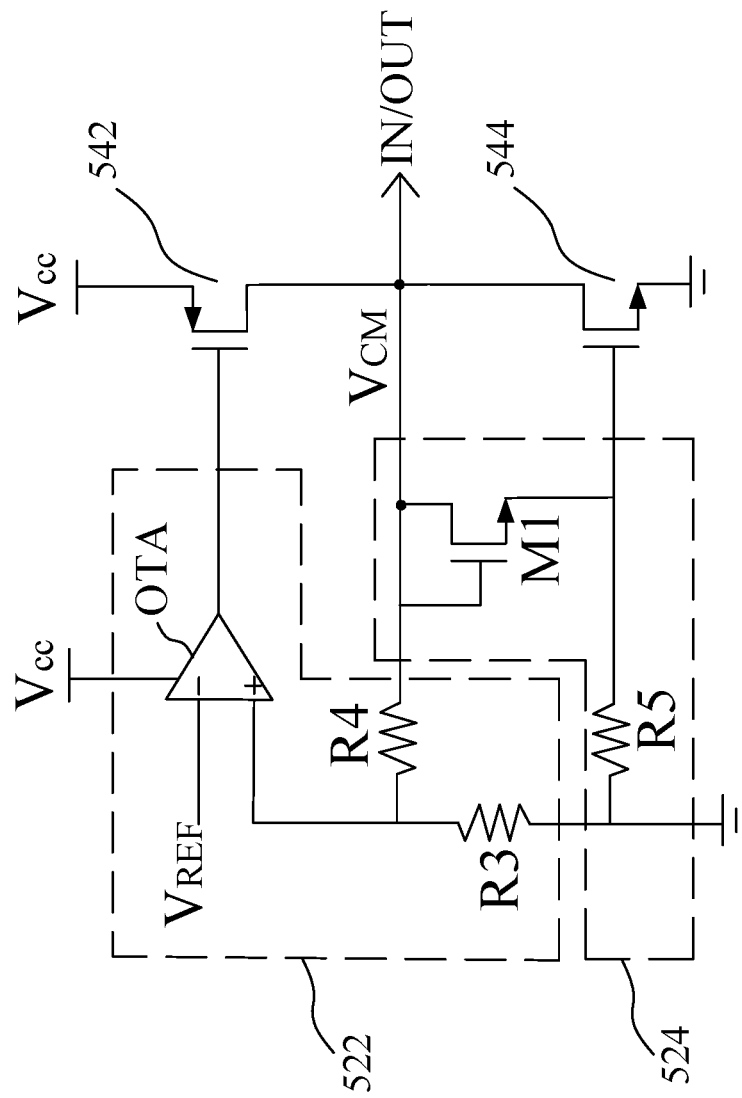
FIG. 6 shows a detailed illustration of the circuit diagram of the high speed detector in accordance with one embodiment of the present invention as shown in FIG. 5.

FIG. 6 shows a detailed illustration of the circuit diagram of the high speed detector in accordance with one embodiment of the present invention as shown in FIG. 5. As can be seen, the source type transient control unit 522 further comprises an operational transconductance amplifier OTA, a third resistor R3 and a fourth resistor R4. The third resistor R3 is connected between ground and the fourth resistor R4. The fourth resistor R4 is further connected to the input end, being also the output end of the high speed detector. The input end of the high speed detector and an output end of the high speed detector are common, i.e. the foregoing node of $V_{CM}$. Two input ends of the operational transconductance amplifier OTA is respectively connected to a reference voltage signal $V_{REF}$ and a jointed end of the third resistor R3 and the fourth resistor R4. And, an output end of the operational transconductance amplifier OTA is connected to the source type current source 542 for controlling the source type current source 542 and generating a source current. According to the embodiment of the present invention, the source type current source 542 can be implemented as a P type Metal Oxide Semiconductor Field Effect Transistor (MOSFET).

In another aspect, the sink type transient control unit 524 may further comprise a fifth resistor R5 and a first transistor M1. According to the embodiment of the present invention, the first transistor M1 can be implemented as an N type Metal Oxide Semiconductor Field Effect Transistor (MOSFET).

The fifth resistor R5 is connected between ground, the third resistor R3 and a source terminal of the first transistor M1. A gate terminal and a drain terminal of the first transistor M1 are commonly connected to the input/output end of the high speed detector, and the source terminal of the first transistor M1 is connected to the sink type current source 544 for controlling the sink type current source 544 and generating a sink current. According to the embodiment of the present invention, the sink type current source 544 can be implemented as an N type Metal Oxide Semiconductor Field Effect Transistor (MOSFET).

In addition, the source type current source 542 and the sink type current source 544 are connected in series between the high voltage level $V_{cc}$ and ground. A source terminal of the source type current source 542 is connected to the high voltage level $V_{cc}$ and a gate terminal of the source type current source 542 is connected to the output end of the operational transconductance amplifier OTA.

A source terminal of the sink type current source 544 is connected to ground. A gate terminal of the sink type current source 544 is connected to the source terminal of the first transistor M1 to receive control from the sink type transient control unit 524, and drain terminals of the sink type current source 544 and the source type current source 542 are commonly connected as an output end of the current source circuit 54 and also to the input/output end of the high speed detector 241.

Figure 4:
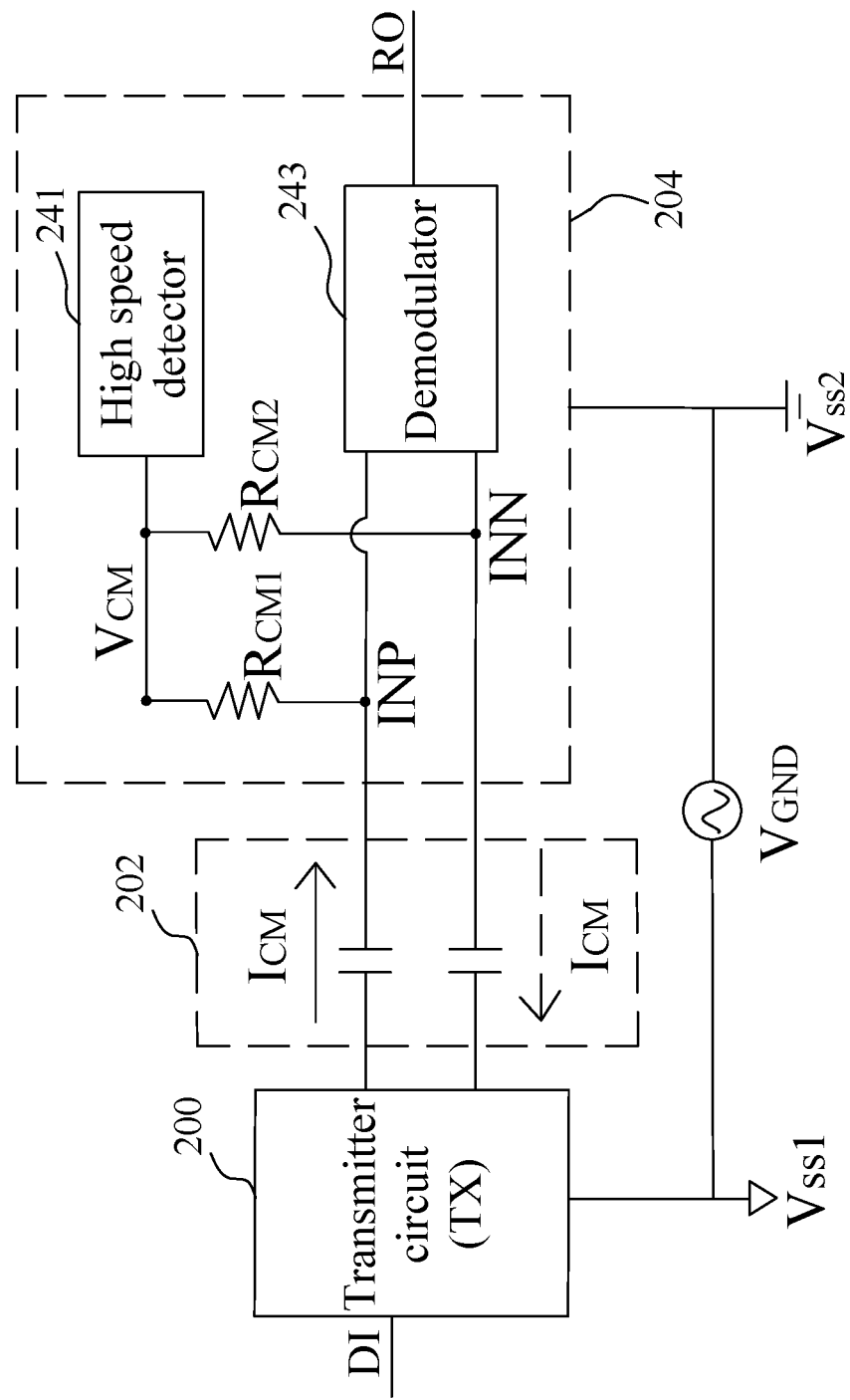
FIG. 4 shows a block diagram of a digital isolator module for high level common mode transient immunity indicating the accordingly induced current $I_{CM}$ due to the transient common noise $V_{GND}$ in accordance with one embodiment of the present invention.

As a result, with referring to FIG. 3 and FIG. 4 at the same time, when the transient common noise $V_{GND}$ is generated and is at its rising edge, the induced current $I_{CM}$ will be generated and injected into the receiver circuit 204. Under such circumstances, voltage level of $V_{CM}$ will start to rise instantly. At this time, the high speed detector 241 detects the raised voltage level of $V_{CM}$ and the sink type transient control unit 524 would be turned on, resulting in an ON path of the sink type current source 544. As such, the induced current $I_{CM}$ which has been injected into the receiver circuit 204 is able to sink to ground through the path owing to the sink type current source 544, forming the sink current. By such designs, interferences occurring at the input/output end of the high speed detector, i.e. $V_{CM}$ are effectively suppressed. In addition, common mode voltage levels at both the nodes of INP and INN are stabilized.

In the same methodology, when the transient common noise $V_{GND}$ is generated and is at its falling edge, the induced current $I_{CM}$ will be generated and flowing back to the transmitter circuit 200. Under such circumstances, voltage level of $V_{CM}$ will start to drop instantly. At this time, the high speed detector 241 detects the declined voltage level of $V_{CM}$ and the source type transient control unit 522 is turned on, resulting in an ON path of the source type current source 542 and forming the source current. As such, the induced current $I_{CM}$ which has been flowing back to the transmitter circuit is able to be compensated due to the generated source current, such that the common mode voltage levels at both the nodes of INP and INN will be stabilized as well.

In the following sections, the present invention will now be verified with experimental simulation results provided below to show that, by employing the proposed digital isolator module for high level common mode transient immunity of the present invention scheme, not only the interferences occurring at $V_{CM}$ can be successfully suppressed, but also the output signal RO is accurate and synchronized with the input signal DI without any propagation delay.

Figure 7:
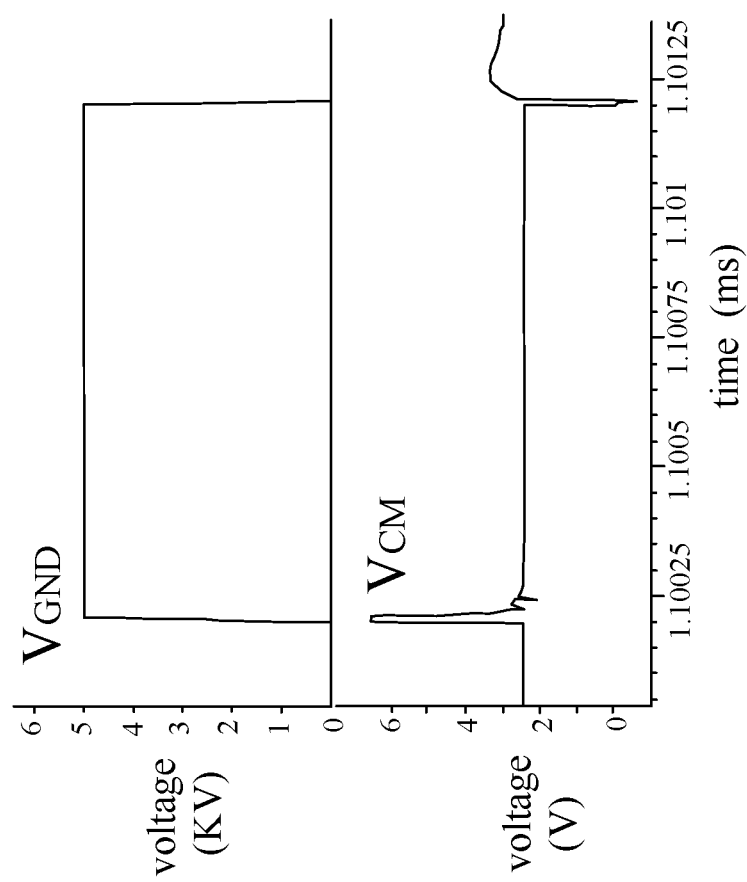
FIG. 7 shows conventional waveform of the transient common noise $V_{GND}$ and interferences of $V_{CM}$ when no high speed detector is employed.
Figure 8:
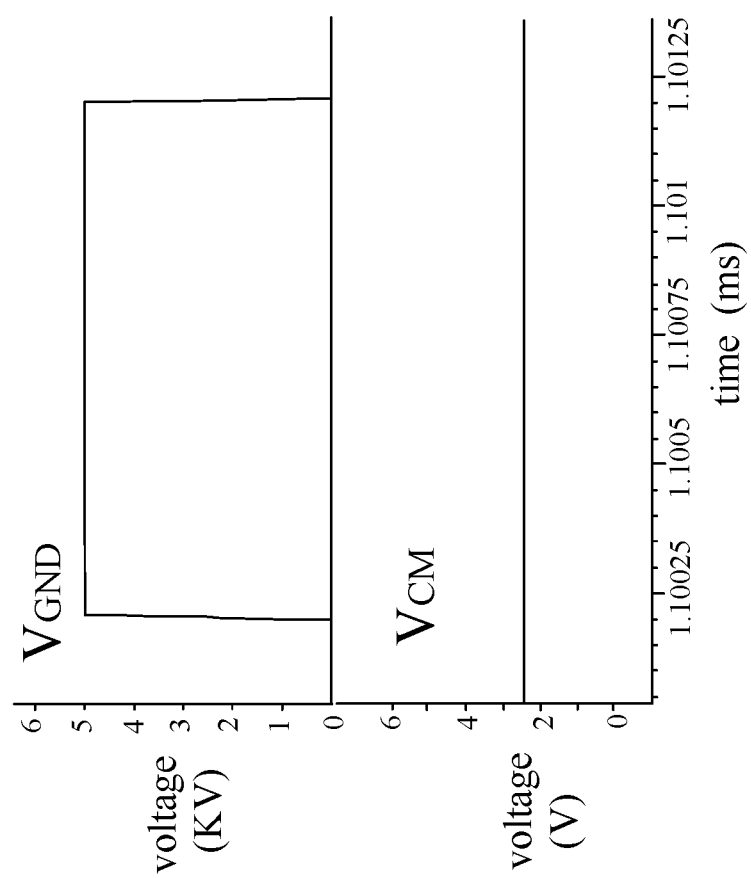
FIG. 8 shows waveforms of the transient common noise $V_{GND}$ and interferences of $V_{CM}$ when the high speed detector of the present invention is employed.

FIG. 7 shows conventional waveforms of the transient common noise $V_{GND}$ and interferences of $V_{CM}$ when no high speed detector is employed, while FIG. 8 shows waveforms of the transient common noise $V_{GND}$ and interferences of $V_{CM}$ when the high speed detector of the present invention is employed. In these figures, the transient common noise $V_{GND}$ is equal to a voltage of $(V_{ss1}-V_{ss2})$, which was raised up to 5 KV from 0V from 1.1 ms to 1.10001 ms, and lowered down to 0V from 5 KV from 1.101 ms to 1.10101 ms. Compared to FIG. 7 when $V_{CM}$ was raised up to 6.405V from 1.1 ms to 1.10001 ms, and lowered down to −364 mV from 1.101 ms to 1.10101 ms due to the transient common noise, it is obvious that the interferences of $V_{CM}$ in FIG. 8 are successfully suppressed, such that a voltage level of $V_{CM}$ can be maintained stably at 2.4V owing to the novel high speed detector employed by the present invention.

Figure 9:
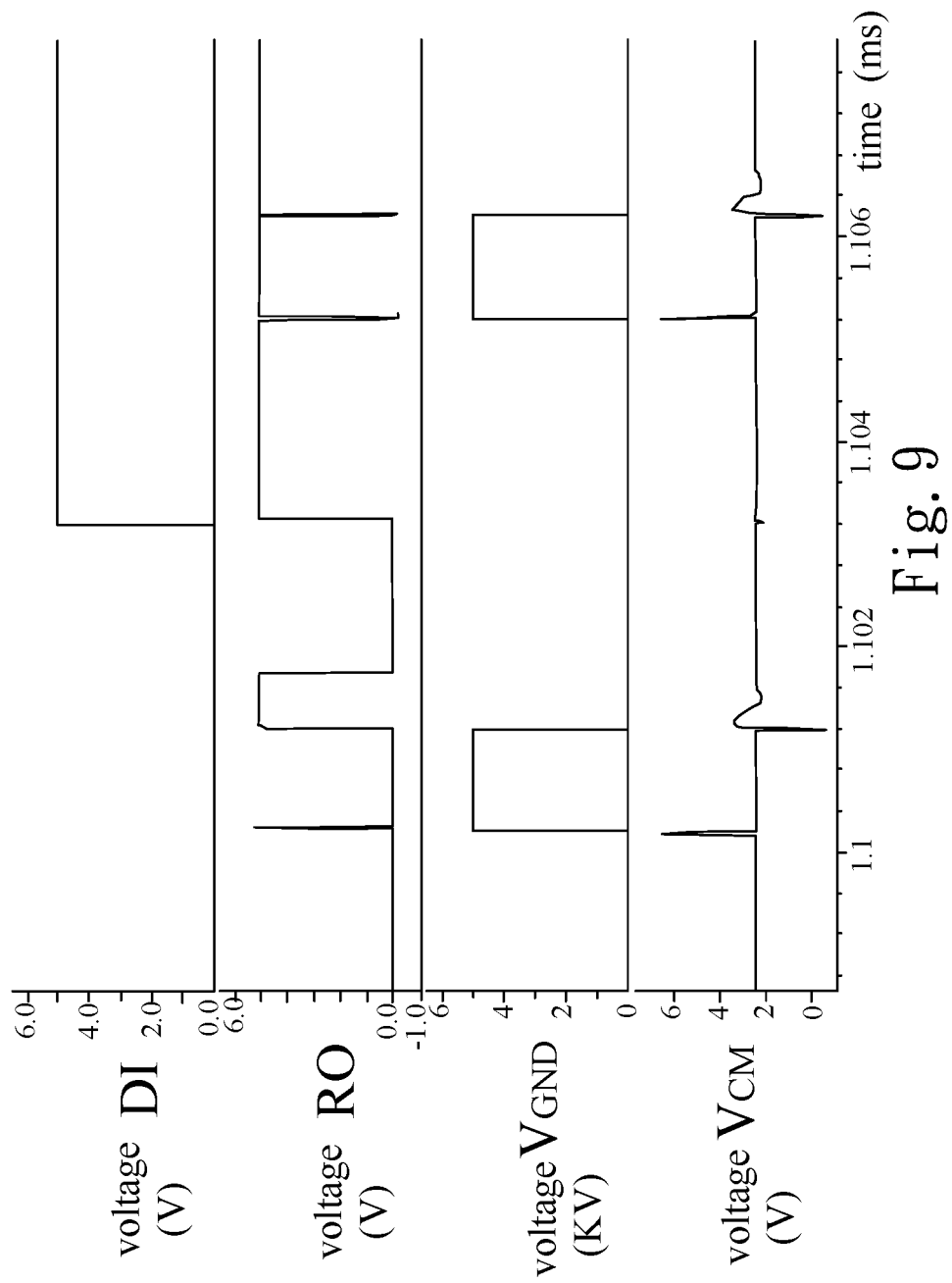
FIG. 9 shows conventional waveforms of the input signal DI, the output signal RO, the transient common noise $V_{GND}$ and interferences of $V_{CM}$ when no high speed detector is employed.
Figure 10:
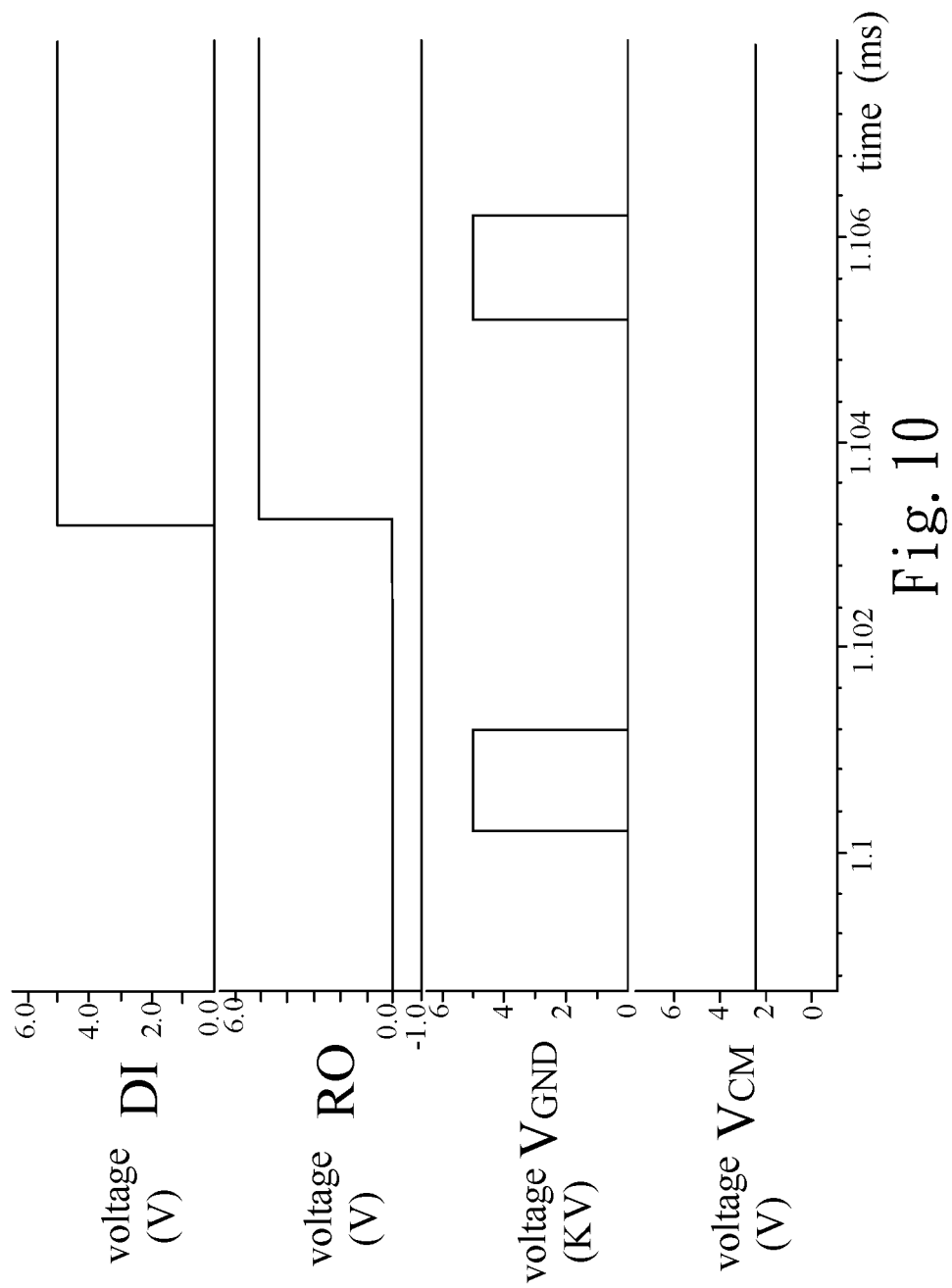
FIG. 10 shows waveforms of the input signal DI, the output signal RO, the transient common noise $V_{GND}$ and interferences of $V_{CM}$ when the high speed detector of the present invention is employed.

Moreover, FIG. 9 shows conventional waveforms of the input signal DI, the output signal RO, the transient common noise $V_{GND}$ and interferences of $V_{CM}$ when no high speed detector is employed, while FIG. 10 shows waveforms of the input signal DI, the output signal RO, the transient common noise $V_{GND}$ and interferences of $V_{CM}$ when the high speed detector of the present invention is employed. In these figures, the transient common noise $V_{GND}$ is equal to a voltage of $(V_{ss1}-V_{ss2})$.

In FIG. 9, it was observed that the output signal RO was not identical to the input signal DI. Also, interferences of $V_{CM}$ were not eliminated. However, compared to the waveforms as shown in FIG. 10 when employing the present invention, it is successfully proved that the output signal RO is improved to follow and being identical to the input signal DI. At the same time, interferences of $V_{CM}$ are effectively suppressed as well such that a voltage level of $V_{CM}$ can be maintained stably at 2.4V owing to the novel high speed detector employed by the present invention.

Figure 11:
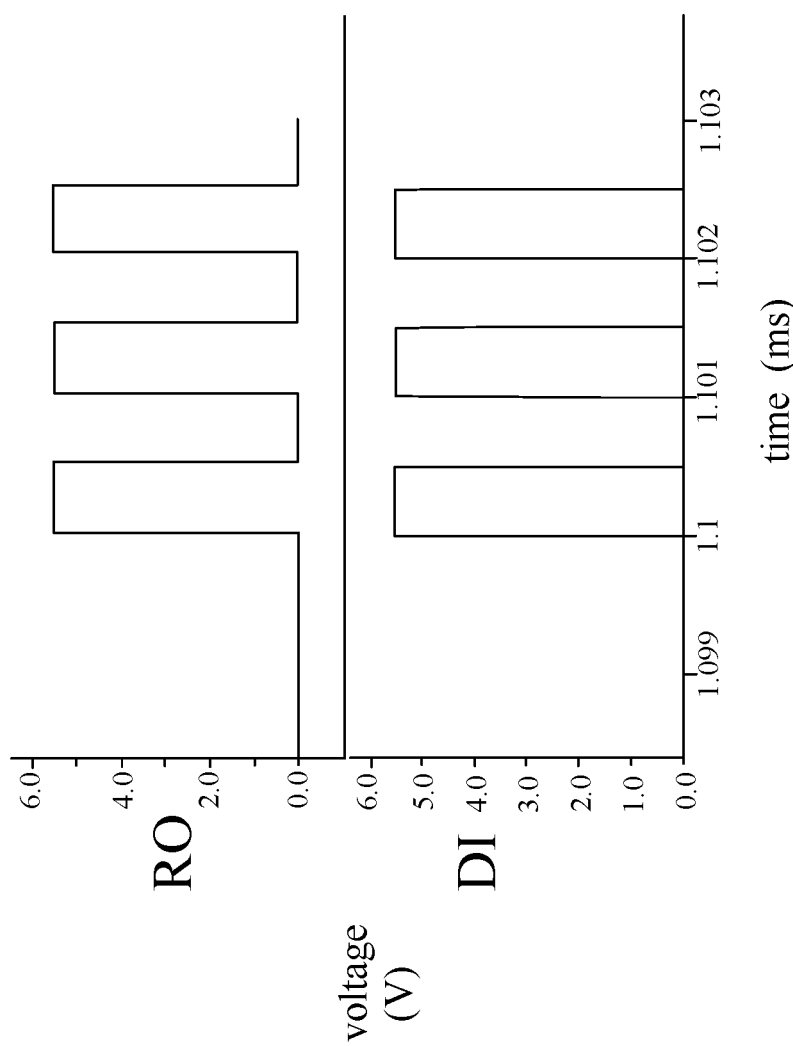
FIG. 11 shows conventional waveforms of the input signal DI and the output signal RO when no high speed detector is employed.
Figure 12:
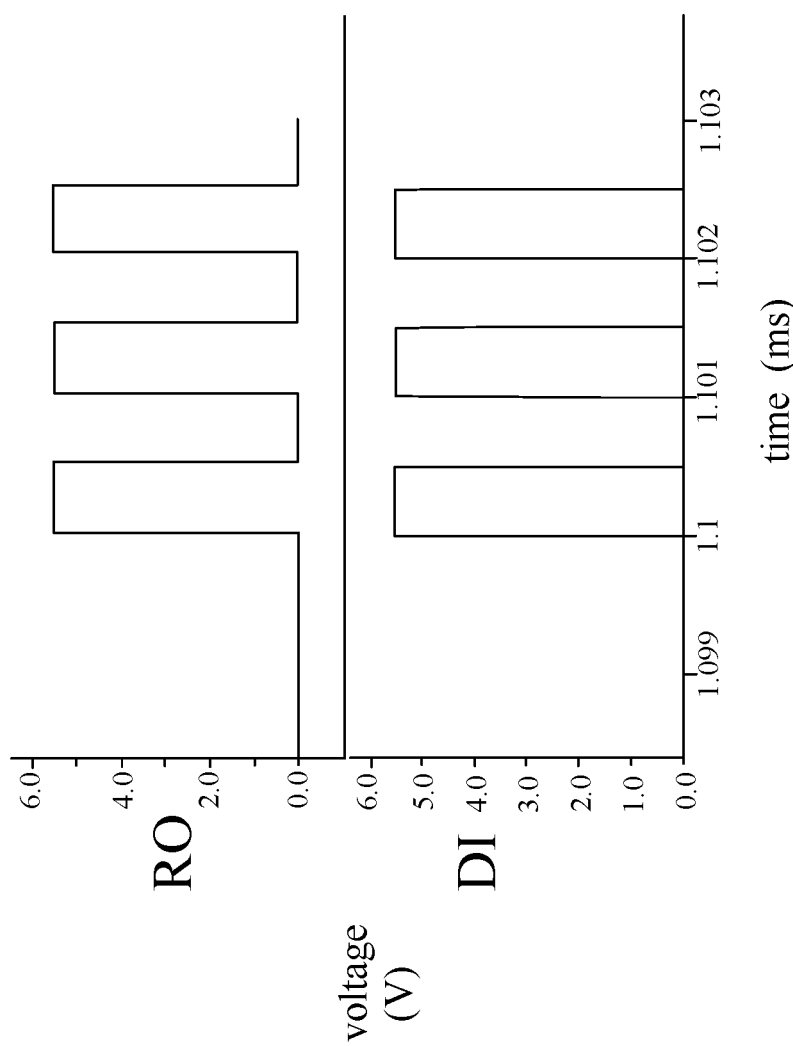
FIG. 12 shows waveforms of the input signal DI and the output signal RO when the high speed detector of the present invention is employed.

Furthermore, FIG. 11 shows conventional waveforms of the input signal DI and the output signal RO when no high speed detector is employed, while FIG. 12 shows waveforms of the input signal DI and the output signal RO when the high speed detector of the present invention is employed. As we compare these two simulation results, we find that the propagation delays (reaction time from DI to RO) are similar. In FIG. 9, the transient response from low to high is 32.25 ns, and the transient response from high to low is 32.64 ns. While in FIG. 10, the transient response from low to high is 32.53 ns, and the transient response from high to low is 32.25 ns. From these simulation results, it is apparent that the propagation delays (reaction time from DI to RO) are similar, and no increase of propagation delay will be caused due to the proposed high speed detector the present invention utilized. This is mostly because the high speed detector disclosed by the present invention is not designed and configured in the main data transmission path along the transmitting side TX to the receiving side RX. As a result, the present invention is advantageous of maintaining excellent data transmission accuracy and making no further data propagation delay.

Therefore, based on at least one proof provided above, it is believed that the proposed digital isolator module of the present invention is characterized by utilizing a high speed detecting mechanism, which is able to sophisticatedly control both a source type current source and a sink type current source to operate, depending on a rise or decline of the transient common noise generated between two ground voltages. Under such circumstances, a compensation current being either a source current or a sink current can be provided to suppress the inferences being induced, and to stabilize the common mode voltages. As such, by employing the proposed circuit diagram, the present invention is believed as beneficial to controlling voltage level stability and robustness of output voltages and thus meanwhile assuring data transmission accuracy.

As a result, when compared to the prior arts, it is obvious that the present invention apparently shows much more effective performances than before. In addition, it is believed that the present invention is instinct, effective and highly competitive for IC technology and industries in the market nowadays, whereby having extraordinary availability and competitiveness for future industrial developments and being in condition for early allowance.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A digital isolator module for high level common mode transient immunity, comprising:
   a transmitter circuit, having an input end connected to an input signal and generating a pair of output differential signals from said input signal, wherein said transmitter circuit is electrically connected to a first ground voltage level;
   an isolation barrier, having two input ends connected to said output differential signals of said transmitter circuit and two output ends;
   a receiver circuit, having a pair of inputs connected with said two output ends of said isolation barrier and generating an output signal, wherein said receiver circuit is electrically connected to a second ground voltage level and said receiver circuit comprises a resistance set, a high speed detector and a demodulator, two first ends of said resistance set are respectively connected to said two output ends of said isolation barrier and two second ends of said resistance set are jointed and connected to an input end of said high speed detector, said input end and an output end of said high speed detector is commonly jointed, said demodulator is connected with said two first ends of said resistance set so as to generate said output signal.

2. The digital isolator module for high level common mode transient immunity according to claim 1, wherein said isolation barrier comprises a first capacitor and a second capacitor which are connected in parallel, each of said first capacitor and said second capacitor is connected between an output end of said transmitter circuit and one of said inputs of said receiver circuit.

3. The digital isolator module for high level common mode transient immunity according to claim 1, wherein said resistance set comprises a first resistor and a second resistor which are connected in parallel, each of said first resistor and said second resistor is connected between an input end of said demodulator and said high speed detector.

4. The digital isolator module for high level common mode transient immunity according to claim 1, wherein said high speed detector comprises a detecting circuit and a current source circuit, said detecting circuit further comprises a source type transient control unit and a sink type transient control unit, said current source circuit further comprises a source type current source and a sink type current source, an output end of each of said source type transient control unit and said sink type transient control unit is respectively connected to said source type current source and said sink type current source for controlling said source type current source and said sink type current source so as to provide said compensation current.

5. The digital isolator module for high level common mode transient immunity according to claim 4, wherein said source type transient control unit comprises an operational transconductance amplifier, a third resistor and a fourth resistor, said third resistor is connected between ground and said fourth resistor which is further connected to said input end and said output end of said high speed detector, two input ends of said operational transconductance amplifier is respectively connected to a reference voltage signal and a jointed end of said third resistor and said fourth resistor, and an output end of said operational transconductance amplifier is connected to said source type current source.

6. The digital isolator module for high level common mode transient immunity according to claim 5, wherein said source type current source is a P type Metal Oxide Semiconductor Field Effect Transistor (MOSFET).

7. The digital isolator module for high level common mode transient immunity according to claim 4, wherein said sink type transient control unit further comprises a fifth resistor and a first transistor, said fifth resistor is connected between ground and a source terminal of said first transistor, a gate terminal and a drain terminal of said first transistor is connected to said input end and said output end of said high speed detector, and said source terminal of said first transistor is connected to said sink type current source.

8. The digital isolator module for high level common mode transient immunity according to claim 7, wherein said sink type current source is an N type Metal Oxide Semiconductor Field Effect Transistor (MOSFET).

9. The digital isolator module for high level common mode transient immunity according to claim 7, wherein said first transistor is an N type Metal Oxide Semiconductor Field Effect Transistor (MOSFET).

10. The digital isolator module for high level common mode transient immunity according to claim 4, wherein said source type current source and said sink type current source are respectively a P type Metal Oxide Semiconductor Field Effect Transistor and a N type Metal Oxide Semiconductor Field Effect Transistor which are connected in series between a high voltage level and ground, a drain terminal of said sink type current source and said source type current source is commonly connected to an output end of said current source circuit.

11. The digital isolator module for high level common mode transient immunity according to claim 10, wherein a source terminal of said source type current source is connected to said high voltage level and a gate terminal of said source type current source is connected to an output end of said source type transient control unit.

12. The digital isolator module for high level common mode transient immunity according to claim 10, wherein a source terminal of said sink type current source is connected to ground and a gate terminal of said sink type current source is connected to an output end of said sink type transient control unit.

* * * * *